Aug. 22, 1961     B. C. PIERCE ET AL     2,997,566
MICROWAVE APPARATUS
Original Filed Dec. 20, 1956
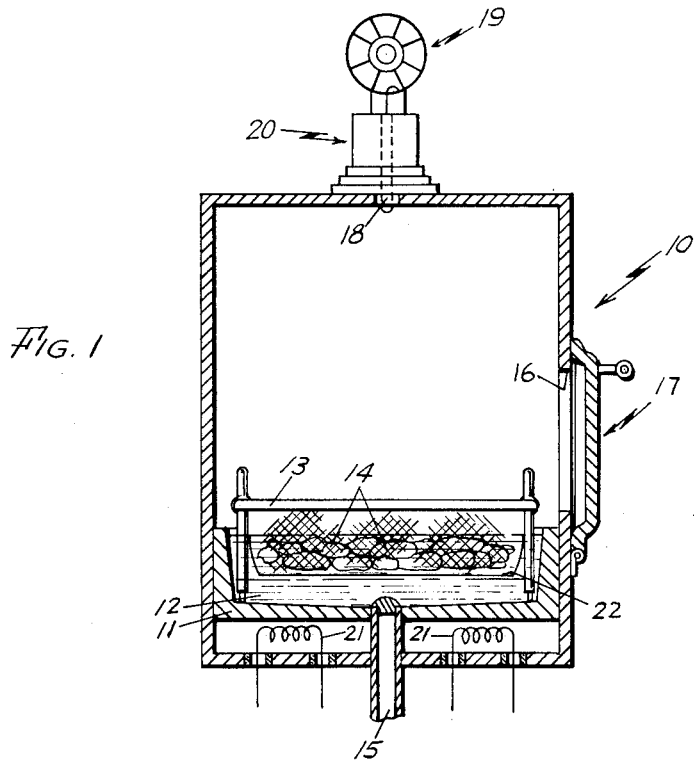
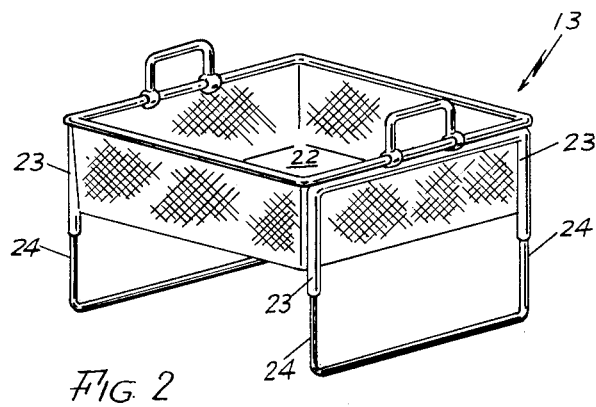
INVENTORS
DAVID A. COPSON AND
BAYARD CRAIG PIERCE, DECEASED
by DANIEL L. O'DONNELL and
   CLIFTON F. ROBINSON,
               Executors
BY Elmer J. Gorn
       ATTORNEY United States Patent Office 2,997,566
Patented Aug. 22, 1961

2,997,566
MICROWAVE APPARATUS
Bayard Craig Pierce, deceased, late of Weymouth, Mass., by Daniel L. O'Donnell, South Weymouth, and Clifton F. Robinson, Milton, Mass., executors, and David A. Copson, Waltham, Mass., assignors to Raytheon Company, a corporation of Delaware
Continuation of application Ser. No. 629,752, Dec. 20, 1956. This application Apr. 14, 1959, Ser. No. 814,941
11 Claims. (Cl. 219—10.47)
(Filed under Rule 47(b) and 35 U.S.C. 118)

This is a continuation of our copending application, Serial No. 629,752, filed December 20, 1956, now abandoned.

This invention relates to apparatus for cooking foodstuffs with microwave energy, and, more specifically, to a combination deep fat fryer and microwave oven for cooking foodstuffs.

In the microwave cooking art, it is well known that microwave energy can be successfully used in the preparation and cooking of various kinds of foodstuffs. Unfortunately, microwave cooking progresses at a uniform rate, with the result that food so cooked does not appear conventional and hence is considered unappetizing. Food that is cooked by conventional devices, such as broiling or deep fat frying, produces a hard crust on the exterior surface of the food and, through years of accepting such food as conventional, the ultimate consumer expects to find a hard crust on foodstuff and he has therefore refused to accept food presented in a different manner. The microwave oven, due to the fact that the food is cooked uniformly, does not produce this hard crust on the exterior surface. This can be readily understood when it is remembered that microwaves will cook at a uniform rate and when cooking bread, for example, there will be produced a white doughy substance that appears to be the inside of a fresh roll without any crust on the outside. People observing bread cooked in this manner have refused to believe that it is bread since it does not have the customary hard crust. This problem of imparting a crust on food cooked in a microwave oven has resulted in this invention. It was discovered that merely placing the deep fat fryer within a microwave oven required excess energy from the microwave energy source, since the microwave energy was absorbed in the fat or cooking medium used to brown the foodstuffs. It was discovered that by increasing the ratio of foodstuffs to the cooking medium used, for example, by placing the foodstuff to be cooked in the cooking medium and at a point just below the surface of the cooking medium, and further, that by restricting the penetration of the microwave energy below the depth of the foodstuff, it is possible to improve the efficiency of the microwave energy source and reduce the total time needed in cooking the foodstuff. This result is achieved by placing the foodstuff in a wire mesh container, which wire container acts as an RF choke at the microwave frequency and thereby confined the microwave energy within said wire mesh. The result of this invention, therefore, is that the microwave energy is used in heating the foodstuff, and not in heating the cooking medium.

Further objects and advantages of this invention will be made more apparent by referring to the accompanying drawing wherein:

FIG. 1 illustrates a microwave oven constructed in accordance to the teaching of this invention; and FIG. 2 illustrates a wire mesh holding device for holding the foodstuff to be cooked, and also for providing the characteristics of an RF choke at the microwave frequency of said microwave energy source.

Referring to FIG. 1, there is shown a hollow enclosure or cavity 10 constructed of suitable metal and adapted to serve as an oven or cooker of the microwave type. Cavity 10 is provided with a metal container 11, which may be made as part of the cavity or which may be a different container set into the cavity so as to closely fit into the bottom section thereof. Container 11 is designed to hold a liquid cooking medium 12. Located within said metal container 11 is a holding device 13 constructed in the form of a wire mesh of such a size as to act as an RF choke or shield to the microwave energy contained in said oven. Holding device 13 is constructed in such a shape as to readily hold a quantity of foodstuff 14. Ordinary vegetable fat has been used as a cooking medium, and is desirable because its dielectric qualities are good and it does not break down as rapidly as animal fat. Container 11 is also provided with a drain 15 whereby the fat may be removed. An access opening 16 is provided in the front wall of the oven, which opening may be closed by means of a thin metal door 17. When door 17 is closed, the cavity 10 is entirely closed except for an opening 18 for the microwave heating means described below.

Microwave energy of the desired frequency is produced with a magnetron 19. Microwaves are generally considered as those having a wave length less than about 100 centimeters. However, the preferred wave length is in the vicinity of 12 centimeters. The microwave energy produced is generated with a magnetron 19 and directed by means of a coupling arrangement 20, wherein the energy generated in magnetron 19 is fed through coupling 20 and directed within cavity 10 by means of the opening 18 in said cavity. The cooking medium 12 is heated to a predetermined cooking temperature before the foodstuff 14 is placed therein by means of external heating devices shown in the form of coils 21 located outside the cavity 10 but within close proximity to cooking medium 12.

In the course of utilizing the equipment as defined herein, it was observed that, by raising the food out of the depth of the cooking medium 12, an increased rate of cooking took place, wherein the foodstuff 14 was cooked by means of the microwave energy and the cooking medium 12 produced the desired crust-like surface on the exterior of said foodstuff. This is the desired result, since it was found wasteful and expensive to use a larger magnetron 19 for the generation of microwave energy for heating the cooking medium. Expressed in another way, it was found that the rate of cooking increased when the ratio of food-to-fat was increased. This unexpected increase in cooking time was further increased by improving the efficiency of the oven by constructing the holding device 13 in the form of a wire mesh that acted as an RF choke to the microwave energy used. In such a device, with holding device 13 holding the foodstuff at a point just under the surface of the cooking medium, it was discovered that the bottom surface 22 of holding device 13 prevents the microwave energy from passing therethrough. This has the effect of preventing the microwave energy from heating the cooking medium, which effect would be a waste of microwave energy and further prolong the cooking time.

Referring now to FIG. 2, there is shown a holding device 13 illustrated in the form of a wire basket. In order to make holding device 13 completely adaptable for various sizes and shapes of foodstuff, it was found desirable to make holding leg 23 adjustable by means of telescoping legs 24 which are arranged and adapted to frictionally engage legs 23 so as to maintain the bottom surface 22 of holding device 13 in a level position. In constructing wire mesh baskets of the type described herein, it was found advantageous not to make the mesh larger than 5/16 of an inch. In the construction of the basket it was also found desirable to construct the bottom surface 22 of an area approximating the size of container 11. With the basket so constructed, it is possible by extending legs 24 to the highest position to place the foodstuff contained in said basket completely out of the cooking medium 12, and thereby utilize cavity 10 as an ordinary microwave oven without the beneficial effect of cooking medium 12. It is possible, therefore, with such an arrangement to have a dual-purpose oven, one having benefits that are well known in the art today and the second achieving the benefits gained by practicing this invention.

This completes the description of the embodiment of the invention described herein. However, many modifications thereof will be apparent to those skilled in the art without departing from the spirit and scope of this invention. For example, many different variations of size and shape of the basket may be used in the process of increasing the ratio of foodstuffs to cooking medium. In view of the above, applicant does not wish to be limited to any details of the invention disclosed therein except as defined by the appended claims.

What is claimed is:

1. In combination, a microwave oven, means for generating and feeding microwave energy to said oven, a liquid cooking medium disposed within a closed container located in said oven, and means for externally heating said liquid cooking medium, said container also holding foodstuffs to be cooked, said container comprising a radio frequency choke at the microwave frequency for confining a substantial amount of said microwave energy within said container.

2. In combination, a microwave oven, means for generating and feeding microwave energy to said oven, a source of liquid cooking medium located in said oven, means for heating said liquid cooking medium with other than said microwave energy, and means located partially within said medium for holding foodstuffs in said cooking medium at a point just below the surface of said cooking medium, said holding means substantially preventing said microwave energy from heating the portion of said cooking medium external to said holding means.

3. In combination, a microwave oven, means for generating and feeding microwave energy to said oven, a source of liquid cooking medium located in said oven, means for heating said liquid cooking medium with other than said microwave energy, and holding means located in said oven for holding foodstuffs within said liquid cooking medium, said holding means comprising an RF choke at the microwave frequency for confining a substantial amount of said microwave energy within said holding means.

4. In combination, a microwave oven, means for generating and feeding microwave energy to said oven, a source of liquid cooking medium located in said oven, means for heating said liquid cooking medium, and means for holding foodstuffs in said cooking medium at a point just below the surface of said cooking medium, said holding means consisting of a bottom wall and side walls perpendicular to said bottom wall, said walls consisting of electrically conductive mesh which is substantially impervious to energy at the microwave frequency for confining a substantial amount of said microwave energy within said holding means.

5. In combination, a microwave oven, means for generating and feeding microwave energy to said oven, a source of liquid cooking medium located in said oven, means for heating said liquid cooking medium, and adjustable holding means located in said oven for holding foodstuffs at a point just below the surface of said cooking medium, said holding means comprising an RF choke at the microwave frequency for confining a substantial amount of said microwave energy within said holding means.

6. In combination, a microwave oven, means for generating and feeding microwave energy to said oven, a source of liquid cooking medium located in said oven, means for heating said liquid cooking medium with other than said microwave energy, and holding means consisting of a wire mesh screen located in said oven for holding foodstuffs within said liquid cooking medium, said holding means comprising an RF choke at the microwave frequency for confining a substantial amount of said microwave energy within said holding means.

7. In combination, a microwave heating apparatus, means for generating and feeding microwave energy into said apparatus, a fluid heating medium disposed within said apparatus, means for heating said heating medium with other than said microwave energy, and holding means located in said apparatus for holding matter to be heated, said holding means comprising a choke at the microwave frequency for confining a substantial amount of said microwave energy within said holding means.

8. In combination, a microwave heating apparatus, means for generating and feeding microwave energy into said apparatus, a fluid heating medium disposed within said apparatus, means for heating said heating medium with other than said microwave energy, and holding means located in said apparatus for holding matter to be heated, said holding means being disposed within a portion of said heating medium, said holding means further comprising a choke at the microwave frequency for confining a substantial amount of said microwave energy within said holding means.

9. In a microwave heating apparatus disposed in proximity with a mass of material to be heated, means for generating and directing microwave energy at said material, means independent of said material for supplying a fluid heating medium to said material, and means for heating said heating medium with other than said microwave energy, said heating medium absorbing only a relatively small portion of the microwave energy impinging thereupon.

10. In combination, a microwave heating apparatus, means for generating and supplying microwave energy to said apparatus, a liquid heating medium disposed within a closed container located in said apparatus and means for externally heating said liquid heating medium, said container also holding objects to be heated, said container comprising a choke at the microwave operating frequency for confining a substantial amount of said microwave energy within said container.

11. In combination, a microwave heating apparatus, means for generating and supplying microwave energy to said apparatus, a source of liquid heating medium located in said apparatus, means for heating said liquid heating medium with other than said microwave energy, means located partially within said medium for holding objects to be heated in said medium at a point just below the surface of said medium, said holding means substantially preventing said microwave energy from heating the portion of said medium external to said holding means.

References Cited in the file of this patent

UNITED STATES PATENTS

| | | |
|---|---|---|
| 2,597,825 | Schroeder | May 20, 1952 |
| 2,601,067 | Spencer | June 17, 1952 |
| 2,762,893 | Long et al. | Sept. 11, 1956 |